United States Patent [19]

Beard

[11] 3,940,028
[45] Feb. 24, 1976

[54] PUMP
[76] Inventor: Walter C. Beard, South St., Middlebury, Conn. 06762
[22] Filed: Sept. 16, 1974
[21] Appl. No.: 505,963

[52] U.S. Cl. ............................................. 222/321
[51] Int. Cl.² ........................................ G01F 11/02
[58] Field of Search .............. 222/321, 383, 402.24; 417/495, 511, 512, 513

[56] References Cited
UNITED STATES PATENTS

| | | | |
|---|---|---|---|
| 3,187,960 | 6/1965 | Gorman | 222/321 |
| 3,211,346 | 10/1965 | Meshberg | 222/321 X |
| 3,228,570 | 1/1966 | Steiman | 222/321 |
| 3,257,961 | 6/1966 | Schlenker | 222/321 X |
| 3,282,472 | 11/1966 | Roder | 222/321 |
| 3,463,093 | 8/1969 | Pfeiffer et al. | 222/321 X |
| 3,531,224 | 9/1970 | Clevenger | 417/513 |
| 3,669,316 | 6/1972 | Corsette | 222/402.24 |
| 3,669,321 | 6/1972 | Susuki et al. | 222/402.24 |

Primary Examiner—Drayton E. Hoffman
Assistant Examiner—Hadd Lane
Attorney, Agent, or Firm—DeLio and Montgomery

[57] ABSTRACT

A pump for dispensing small metered quantities of a liquid from a container such as a jar or can, the pump including a housing and a plunger, in combination with a valve comprising an annular washer having a rectangular cross-section, assembled between the pump housing and the plunger to provide tight seals throughout a plurality of annular surfaces, in order to prevent leakage in the closed position, and to tilt axially on the pumping stroke to permit escape of the liquid being pumped. Automatically opening container venting means is also provided.

11 Claims, 9 Drawing Figures

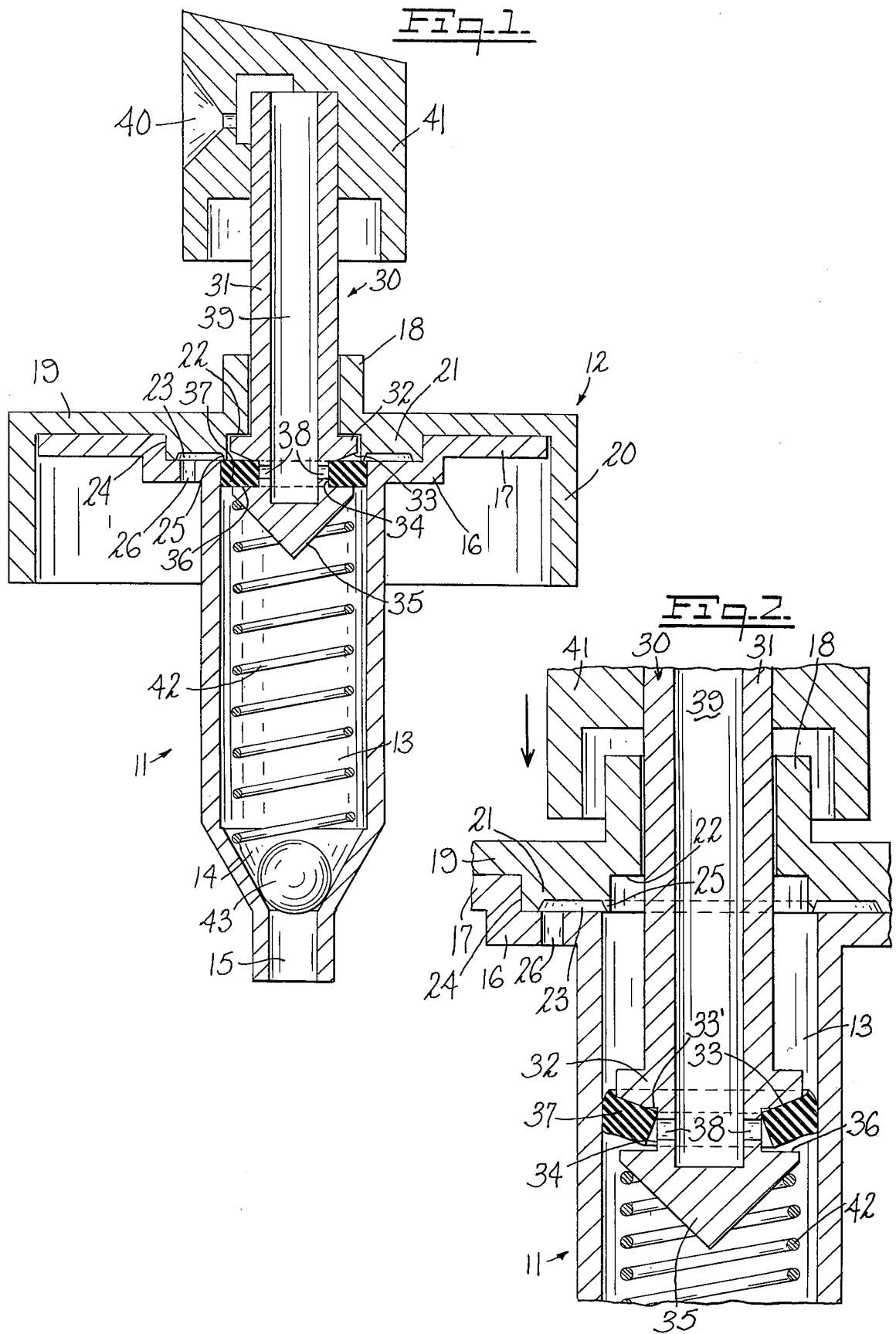

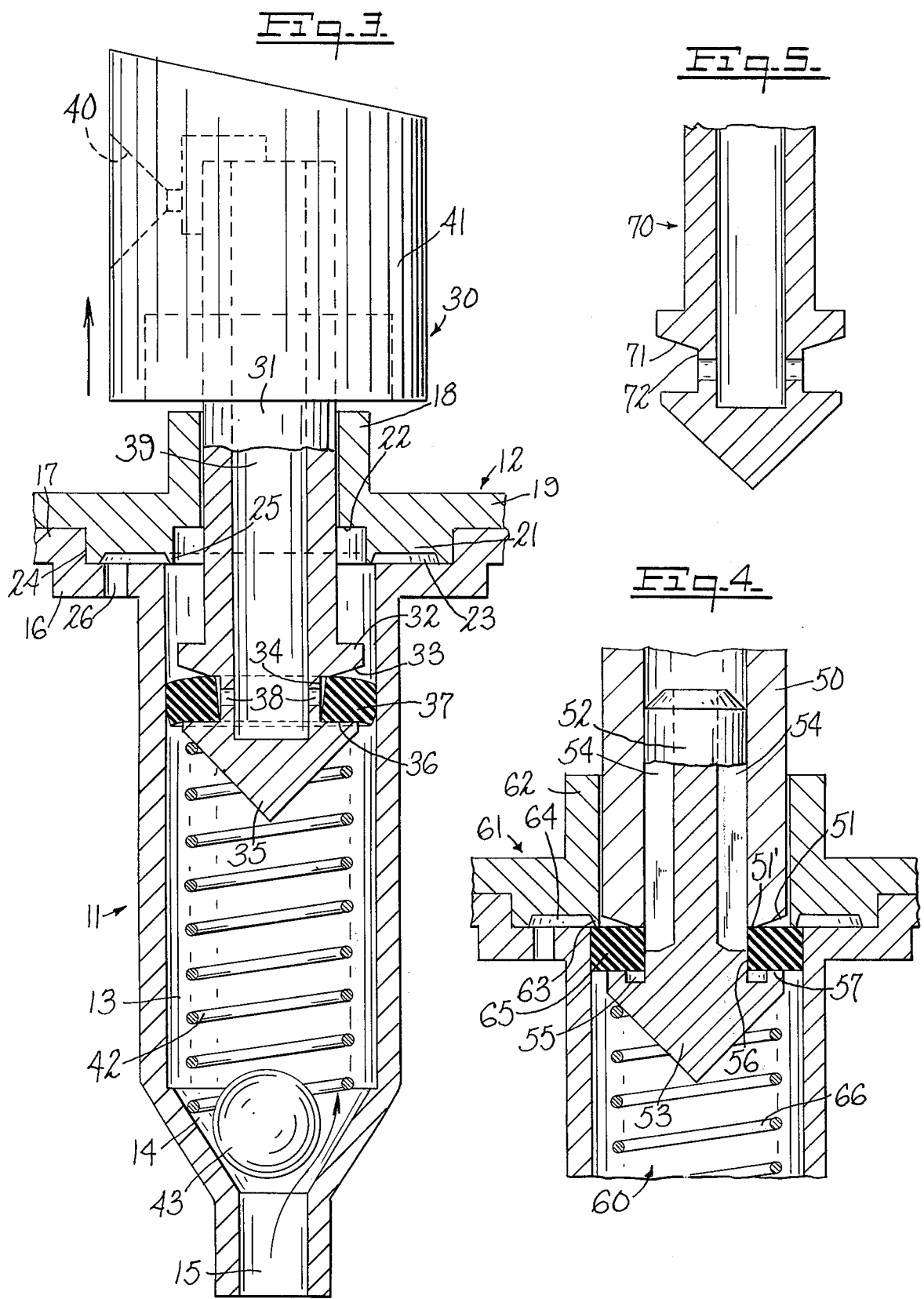

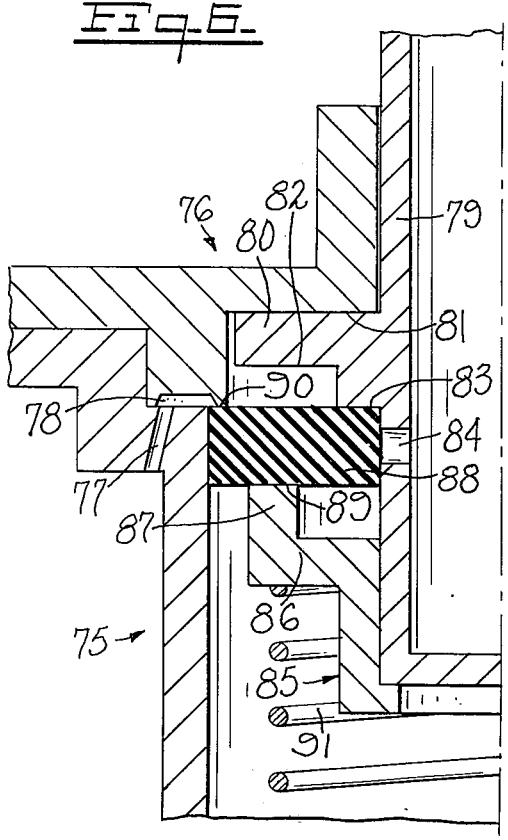
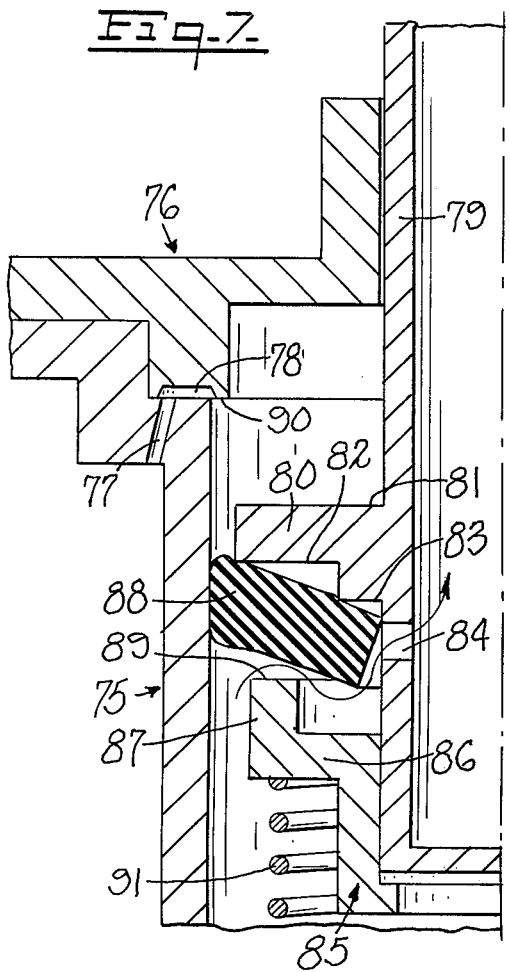
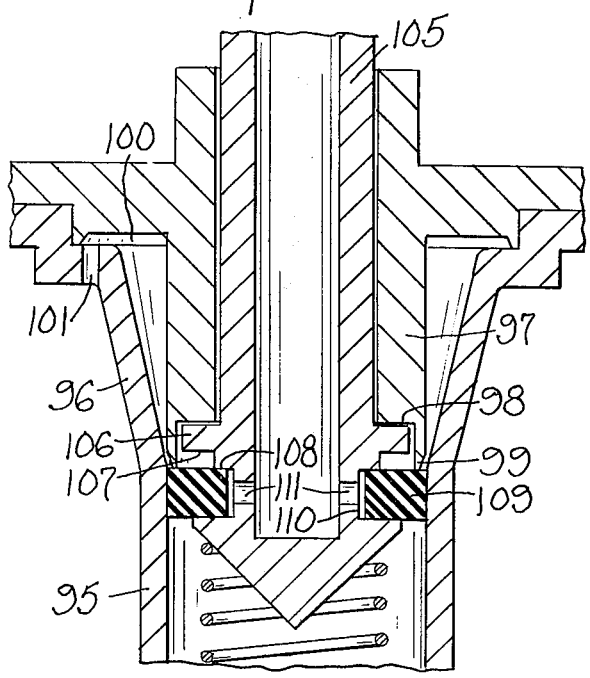
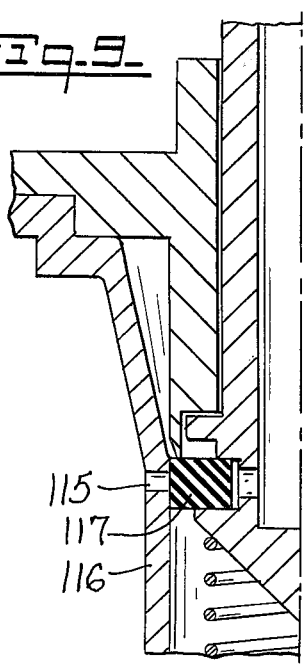

PUMP

BACKGROUND OF THE INVENTION

This invention relates to a pump adapted for mounting on a container, such as a jar or can, and operable to dispense small metered quantities of liquid from the container, the pump comprising a housing and a plunger in combination with a valve constituted by an annular washer mounted between the housing and the plunger and movable with the plunger, the washer being so related to the housing and plunger that it effects a good seal in the closed position and opens readily to permit passage of the liquid being pumped.

In valves for pressurized containers such as aerosol cans the gaskets are generally of the fixed type, having their outer portions firmly gripped between housing elements and their radially inner portions deformable to open and close an aperture, e.g., in a depressable stem, as in the patent to Abplanalp, U.S. Pat. No. 2,631,814. Kitabayashi U.S. Pat. No. 3,061,203 shows such a fixed gasket combined with a free gasket and operable to open a passage for paint and another passage for gas, both under pressure, for spray painting. British Pat. No. 1,112,531 shows a pump and valve assembly for a non-pressurized container wherein an annular "sealing ring" slides in an elongated recess, without deformation, between closed and open positions.

It is an object of the invention to provide a pump and valve assembly which is simple to manufacture and to operate, and which has a very efficient sealing arrangement to prevent leakage, both at rest and in use.

It is a further object of the invention to effect reliaable sealing by mounting an annular washer in a position to maiantain positive sealing contact with adjacent surfaces along a plurality of annular areas.

It is another object of the invention to provide an annular washer of rectangular cross-section, at rest, which is movable with the plunger and is adapted to be distorted, in operation, to a plurality of dished positions.

It is a further object of the invention to provide certain improvements in the form, construction and arrangement of the parts whereby the above-named and other objects may effectively be attained. The invention accordingly comprises an article of manufacture possessing the features, properties, and the relation of elements which are exemplified in the article hereinafter described, and the scope of the invention will be indicated in the claims.

A practical embodiment of the invention is shown in the accompanying drawing wherein:

FIG. 1 represents a vertical axial section of the pump and valve assembly in the "at rest" position;

FIG. 2 represents a vertical axial section of the pump and valve assembly in the depressed pumping or delivery position, parts being broken away;

FIG. 3 represents a vertical axial section of the pump and valve assembly in the course of recovery and refilling, after completion of a delivery stroke;

FIG. 4 represents a detail vertical axial section showing a modified form of plunger;

FIG. 5 represents a detail axial section of a modified form of plunger, a part being broken away;

FIG. 6 represents a detail axial half section of a housing and modified form of plunger, in the "at rest" position, parts being broken away;

FIG. 7 represents a detail axial half section of the parts shown in FIG. 6 in the pumping or delivery position;

FIG. 8 represents a detail axial section of a modified form of housing and plunger; and FIG. 9 represents a detail axial half section of a modified form of the housing shown in FIG. 8.

Referring to the drawings, the pump housing consists of the chamber portion 11 and the cap 12. The chamber portion includes a cylindrical metering chamber 13, terminating downwardly in a frusto-conic base 14 and an intake tube 15, and having at its upper end an outwardly projecting stepped flange 16, 17. The cap 12 includes a cylindrical collar 18, an outwardly extending annular cover portion 19 and a depending skirt 20. An annular rib 21 projects downwardly from the cover portion a short distance outward from the base 22 of the collar 18, the rib being formed with a shallow annular channel 23 on its lower surface. The outer side of the rib 21 fits against the step 24 between the portions 16, 17 of the flange and the bottom of the rib outside of the channel 23 rests against the upper surface of the flange portion 16, while the bottom edge 25 of the rib, defining the radially inward side of the channel, lies inwardly from the upper edge of the metering chamber. The channel is connected to the interior of the cap by a vent hole 26 through the flange portion 16.

The plunger 30 comprises a tubular portion 31, adapted to slide freely in the collar 18, a flange 32, having a flat upper surface and a beveled lower surface 33, a cylindrical portion 34 and a conical base 35, the upper peripheral surface 36 of which forms the bottom of the groove in which the valve washer 37 rests. The beveled surface 33 may be bounded radially inwardly by a narrow flat annular surface 33'. Radial holes 38 extend from the cylindrical portion 34 to the plunger bore 39 and the latter communicates with the nozzle 40 in the side of the push buttom 41.

A spring 42 in the chamber 13 urges the plunger toward its upper position (FIG. 1) and a ball 43 in the base 14 permits liquid to enter the chamber from the tube 15 on the suction stroke of the plunger, while closing off the tube on the pumping stroke.

The valve washer 37, of any suitable material, is rectangular in cross-section and is held, in the "at rest" position, in tight sealing contact with the wall of the metering chamber, with the edge 25 of the rib 21 on the plunger and with the surface 36 on the plunger base and may also fit tightly against the surface 34 or may be spaced therefrom as shown in FIGS. 8 and 9. Engagement of the washer with the chamber wall and plunger surfaces prevents the escape of liquid from the chamber into the plunger bore, and engagement of the washer with the chamber wall and the rib edge 25 prevents escape of liquid from the container through vent hole 26 and channel 23 to atmosphere through the collar 18.

It will be understood that the cap 12 is intended to be permanently or removably mounted on or affixed to a container for the liquid to be dispensed, and the intake tube 15 is designed to constitute or to be connected to a dip tube.

In operation, assuming the chamber 13 to be full of liquid from a previous cycle, the push button 41 is depressed forcing the plunger downward into the chamber 13. The washer 37 is in frictional engagement with the chamber surface and in driving engagement with the beveled surface 33 so that it immediately assumes the dished form shown in FIG. 2; the upper surface of the washer moves out of contact with the edge 25 of the rib, which vents the interior of the container to atmosphere through hole 26 and collar 18 as well as permitting air to relieve the negative pressure in the chamber above the washer. Mechanical dishing of the washer and/or hydraulic pressure thereon also tilts its inner surface away from the second cylindrical portion 34, exposing the holes 38 (if not already exposed), and raises the lower inner edge of the washer away from the surface 36 to open a passage for the expulsion of liquid from the interior of the chamber to the bore of the plunger and thence out of the nozzle 40. The liquid may be delivered as droplets or a small stream, or may be broken up and atomized, in a known manner.

On the "refill" stroke (FIG. 3) the spring 42, which was compressed during the delivery stroke, raises the plunger toward its original position, the washer drags against the wall of the chamber to provide a good wiping seal, the resulting negative pressure causes the ball 43 to lift, and the chamber is refilled with liquid drawn up through the tube 15, as indicated by the arrow at the bottom of FIG. 3. Until the moment when the washer re-engages the edge 25 of the rib 21, both the interior of the container and the upper portions of the chamber are vented to atmosphere so that no undesired positive or negative pressure conditions can exist.

In the modified form of FIG. 4 the plunger comprises a cylindrical part 50, the lower end of which is beveled at 51 to correspond to the bevel 33 in FIG. 1 (preferably also with a flat surface 51' corresponding to 33'), and a separate plug 52 integral with the conical base 53 and traversed vertically by grooves 54, extending from the top of the plug to points near the top of the base. An annular groove 55 is formed in the top of the base, bounded by the cylindrical side wall 56 of the plug and by an annular land 57.

The chamber portion 60 includes a metering chamber which is the same as chamber 13 in FIG. 1 but the cap 61 is slightly different from cap 12 in that the sleeve 62 has no lower surface (like surface 22) other than the inner edge 63 of the channel 64. The washer 65, like washer 37, is in sealing engagement with the wall of the metering chamber, with the edge 63 of the channel, and with the annular land 57, and may also fit tightly against the cylindrical surface 56. Sealing engagement is maintained by the pressure of spring 66 against the conical base 53, and the operation of the washer is substantially identical to that shown and described in connection with FIGS. 1 to 3. On the discharge stroke the washer becomes dished against the surface 51 and liquid flows under the washer, over the annular land 57, through or past the groove 55, up along cylindrical portion 56 (exposed or given greater exposure by outward movement of the washer) and into the grooves 54, for discharge through a nozzle as previously described.

The plungers of FIGS. 1 to 4 may be modified in respect of their downwardly facing surfaces (33 or 51) by the elimination of the flat surfaces 33' or 51', as shown in FIG. 5 where the plunger 70, otherwise similar to the plunger 30, has a beveled surface 71 intersecting the cylindrical surface 72.

As an alternative to the beveled surfaces 33, 51 and 71, the downwardly facing plunger surface may be stepped as shown in FIGS. 6 to 9.

According to FIG. 6 the pump and valve assembly comprises a housing having chamber portion 75 and cap 76 with vent hole 77 and channel 78 corresponding to the elements 11, 12, 26 and 23 of FIG. 1. The plunger comprises a tubular portion 79, closed at the bottom, and a flange 80 having a flat upper surface 81 and a stepped lower surface 82, 83. The wall of the plunger is traversed by radial holes 84, just below the step 83. A ferrule 85 is fitted freely on the lower end of the plunger, the ferrule including a flange portion 86 and an annular rim 87. A valve washer 88, similar to washers 37 and 65, seals outwardly against the wall of the chamber and is held by the surface 89 of the rim 87 against the lower step 83 of the plunger and against the edge 90 of the channel 78. The washer may or may not seal against the cylindrical surface of the plunger in the zone of the holes 84. The ferrule is biased upward against the bottom of the plunger body by a spring 91 corresponding to springs 42 and 66.

The operation of the pump just described is illustrated in FIG. 7. When the plunger is depressed, as by a push button, not shown, the washer is subjected to downward pressure only by the lower step 83, similar to the action of the surfaces 33' or 51', or the inner edge of surface 71 in FIGS. 2, 4 and 5. The peripheral drag of the washer against the wall of the chamber causes it to assume a dished position, no longer engaging tightly the surface 89 of the ferrule and exposing the holes 84 (if not already exposed). Any downward motion of the plunger also moves the washer away from the edge 90 of the venting channel 78 to vent the interior of the container and upper portion of the chamber, as previously described. Hydraulic pressure between the bottom of the washer and the ferrule surface 89 may cause the ferrule to move downward slightly, if necessary, to open a path for escape of liquid as indicated by the arrows in FIG. 7.

In the modified form of FIG. 8 the chamber includes a cylindrical portion 95 and an upwardly flared portion 96, while the cap has an elongated sleeve 97 terminating downwardly in a flat surface 98 and a depending skirt 99, the lower edge of which lies in the plane of the junction between portions 95 and 96. The skirt may be somewhat beveled to provide clearance between its bottom edge and the wall of the chamber. The cap has a channel 100 on its lower surface and the chamber has a vent hole 101 adjacent the top of the flared portion 96, corresponding to the channels 23, 64 and 78 and vent holes 26 and 77, previously described. The plunger 105 is of one-piece construction, as in FIG. 1, but the lower surface of its flange 106 is stepped at 107, 108 like the flange 80 in FIGS. 6 and 7. The valve washer 109 seals against the wall of the cylindrical portion 95 but is shown as being not in contact with the cylindrical surface 110 of the plunger wherein the radial holes 111 are located. At rest, leakage along the vent path from hole 101, through channel 100 and past the edge of skirt 99 is prevented by the sealing engagement of the washer against the chamber wall and against said edge. On the pumping stroke of the plunger the washer assumes a position somewhat as shown in FIGS. 2 or 7, permitting passage of liquid from the chamber to the holes 111 for delivery as previously described. An advantage of the form shown in FIG. 8 is that the plunger can be assembled with the chamber portion very easily, due to the provision of flared portion 96.

The modified form shown in FIG. 9 is similar to that of FIG. 8 except that the channel 100 is omitted and the vent hole 115 is located in the wall of the chamber, at the top of the cylindrical portion 116 in a position to be obturated by the valve washer 117.

From the foregoing it will be seen that, in each instance, the washer is in sealing contact, at rest, with four or five surfaces of the adjacent elements, and that it maintains sealing contact with three surfaces during the delivery and refill strokes, while automatically venting the container to atmosphere. The number and complexity of the parts are reduced to a minimum, so that the pump is inexpensive to make and not liable to breakage or mechanical failure. The washer may be die cut rubber or plastic. All the parts are suited for high speed automatic assembly.

Products which can be dispensed with a pump sprayer instead of an aerosol valve would not require the costly propellants and cans used in the aerosol industry. Furthermore, physiological damage to human beings is likely to result from overexposure to certain aerosol propellants and/or to the finely dispersed products delivered by aerosol sprays. The pump disclosed herein can replace, economically, aerosol dispensing of many products with resulting improvement of air quality and human health.

It will thus be seen that the objects set forth above, among those made apparent from the preceding description, are efficiently attained and, since certain changes may be made in the above article without departing from the spirit and scope of the invention, it is intended that all matter contained in the above description and shown in the accompanying drawing shall be interpreted as illustrative and not in a limiting sense.

What I claim is:

1. A dispensing pump and valve assembly for use with a container for liquid comprising, a chamber provided with an inlet to admit liquid from the container past a one-way valve, the chamber having a cylindrical wall, a cap fitted on said chamber, the cap having a portion of its under side spaced from a chamber surface to provide a channel in communication with the interior of the chamber and with the interior of the container, a plunger having a cylindrical stem portion adapted to pass freely through an opening in the cap, an annular flange having a downwardly facing surface, a second cylindrical surface portion adjacent said downwardly facing surface, a plunger base having an upwardly facing annular surface adjacent said second cylindrical surface portion, a longitudinal passage in the plunger, a lateral passage connecting said longitudinal passage with the second cylindrical surface portion, an annular washer of distortable material having a cylindrical inner surface and parallel upper and lower surfaces normal to said inner surface, the height of said inner surface being substantially constant and equal to the height of said second cylindrical surface portion and being less than the width of said washer across any radial section, said washer resting in sealing engagement against at least a portion of said downwardly facing surface, said upwardly facing annular surface and said chamber wall, and a spring biasing the plunger upward to hold the washer in a position to close off said channel.

2. A dispensing pump and valve assembly according to claim 1 wherein the downwardly facing surface is at least partially beveled upward away from the upper surface of the washer.

3. A dispensing pump and valve assembly according to claim 1 wherein the downwardly facing surface includes a flat annular surface intersecting the top of the second cylindrical surface portion, the upper surface of the annular washer extending radially outward beyond the outer edge of said annular surface.

4. A dispensing pump and valve assembly according to claim 3 wherein the downwardly facing surface is stepped.

5. A dispensing pump and valve assembly according to claim 1 wherein the downwardly facing surface of the flange, the second cylindrical surface portion of the plunger and the adjacent upwardly facing annular surface constitute a valve seat and wherein the annular washer rests in sealing engagement with each said surface.

6. A dispensing pump anad valve assembly according to claim 1 wherein the upwardly facing annular surface is provided with an annular groove.

7. A dispensing pump and valve assmebly according to claim 1 wherein the longitudinal passage in the plunger is an axial bore.

8. A dispensing pump and valve assembly according to claim 7 wherein the plunger base is integral with the stem portion.

9. A dispensing pump and valve assembly according to claim 1 wherein the plunger includes a separate plug portion and the longitudinal passage includes vertical groove in a surface of said plug portion.

10. A dispensing pump and valve assembly according to claim 9 wherein the plunger base is integral with the plug portion.

11. A dispensing pump and valve assembly according to claim 10 which includes an annular groove in the upper surface of the base, adjacent the second cylindrical surface portion.

* * * * *